United States Patent
Claes (10) Patent No.: US 9,574,886 B2
(45) Date of Patent: Feb. 21, 2017

(54) METHOD AND COMPUTER PROGRAM PRODUCT FOR ESTIMATING A TRAVEL TIME FOR A VEHICLE

(71) Applicant: VOLVO TECHNOLOGY CORPORATION, Göteborg (SE)

(72) Inventor: Pihl Claes, Jonsered (SE)

(73) Assignee: Volvo Technology Corporation, Göteborg (SE)

( * ) Notice: Subject to any disclaimer, the term of this patent is extended or adjusted under 35 U.S.C. 154(b) by 0 days.

(21) Appl. No.: 14/434,766

(22) PCT Filed: Oct. 11, 2012

(86) PCT No.: PCT/EP2012/004252
§ 371 (c)(1),
(2) Date: Apr. 10, 2015

(87) PCT Pub. No.: WO2014/056514
PCT Pub. Date: Apr. 17, 2014

(65) Prior Publication Data
US 2015/0292892 A1 Oct. 15, 2015

(51) Int. Cl.
*G06Q 10/08* (2012.01)
*G01C 21/34* (2006.01)

(52) U.S. Cl.
CPC ......... *G01C 21/34* (2013.01); *G01C 21/3492* (2013.01)

(58) Field of Classification Search
CPC ......... G01C 21/34; G06Q 10/08; G07C 5/008
USPC ........................................... 701/1, 31.4, 533
See application file for complete search history.

(56) References Cited

U.S. PATENT DOCUMENTS

| 2005/0060070 A1* | 3/2005 | Kapolka | G07C 5/008 701/31.4 |
| 2010/0217519 A1 | 8/2010 | Englerth | |
| 2011/0307166 A1 | 12/2011 | Hiestermann | |
| 2012/0253548 A1* | 10/2012 | Davidson | G06Q 10/08 701/1 |

FOREIGN PATENT DOCUMENTS

WO    2012041490 A1    4/2012

OTHER PUBLICATIONS

International Search Report (Jun. 17, 2013) for corresponding International App. PCT/EP2012/004252.
International Preliminary Report on Patentability (Jan. 23, 2015) for corresponding International App. PCT/EP2012/004252.

* cited by examiner

*Primary Examiner* — Yuri Kan
(74) *Attorney, Agent, or Firm* — WRB-IP LLP (57) ABSTRACT

A method and software are provided for estimating a travel time for a vehicle including the steps of determining a route for which the travel time is to be estimated, dividing the route into route sections, wherein each route section has substantially constant road characteristics, selecting a vehicle configuration for the vehicle, retrieving, from a database, an estimated travel time for each route section based on each route section for the selected vehicle configuration, aggregating the estimated travel times for each route section from the database into a total travel time for the determined route. Furthermore a method for creating, and using, the database is provided.

15 Claims, 7 Drawing Sheets

| A1 | | |
|---|---|---|
| Distance (m) | Speed (km/h) | Time (s) |
| 0 | 0,0 | 0 |
| 2 | 3,7 | 3,9 |
| 4 | 6,8 | 5,3 |
| 6 | 9,1 | 6,2 |
| 8 | 12,0 | 6,8 |
| 10 | 14,0 | 7,4 |
| 12 | 16,0 | 7,9 |
| 14 | 18,0 | 8,3 |
| 16 | 19,8 | 8,7 |
| 18 | 21,1 | 9,0 |
| 20 | 22,8 | 9,4 |
| 22 | 24,0 | 9,7 |
| 24 | 25,0 | 9,8 |
| 26 | 26,0 | 10,2 |
| 28 | 26,9 | 10,5 |
| 30 | 27,8 | 10,8 |
| 32 | 28,0 | 11,0 |
| 34 | 28,7 | 11,3 |
| 36 | 28,9 | 11,6 |
| 38 | 29,0 | 11,8 |

| D2 | | |
|---|---|---|
| Distance (m) | Speed (km/h) | Time (s) |
| 0 | 36,0 | 0,0 |
| 2 | 30,1 | 0,2 |
| 4 | 25,2 | 0,5 |
| 6 | 22,0 | 0,8 |
| 8 | 19,2 | 1,1 |
| 10 | 17,3 | 1,5 |
| 12 | 15,2 | 2,0 |
| 14 | 13,8 | 2,5 |
| 16 | 12,8 | 3,0 |
| 18 | 12,2 | 3,6 |
| 20 | 12,0 | 4,2 |

| D2 | | |
|---|---|---|
| Distance (m) | Speed (km/h) | Time (s) |
| 0 | 36,0 | 0,0 |
| 2 | 34,2 | 0,2 |
| 4 | 32,4 | 0,4 |
| 6 | 30,6 | 0,6 |
| 8 | 28,8 | 0,9 |
| 10 | 27,0 | 1,2 |
| 12 | 25,2 | 1,4 |
| 14 | 23,4 | 1,7 |
| 16 | 21,6 | 2,0 |
| 18 | 19,8 | 2,4 |
| 20 | 18,0 | 2,8 |
| 22 | 16,0 | 3,2 |
| 24 | 14,1 | 3,7 |
| 26 | 12,1 | 4,2 |
| 28 | 10,1 | 4,9 |
| 30 | 8,0 | 5,7 |
| 32 | 7,0 | 6,6 |
| 34 | 3,9 | 7,9 |
| 36 | 1,9 | 10,4 |
| 38 | 0,0 | 18,0 |

METHOD AND COMPUTER PROGRAM PRODUCT FOR ESTIMATING A TRAVEL TIME FOR A VEHICLE

BACKGROUND AND SUMMARY

The present invention relates to a vehicle travel time estimation method. The invention also relates to a computer program product.

Running a profitable work site, such as a gravel pit or construction site, requires a lot of logistic planning with many interrelated activities. For example, the loading process of a wheel loader or excavator, the travel time for transportation vehicles etc. must be estimated. Some activities, such as the loading process of a wheel loader or excavator are rather easy to estimate due to that the process consists of a number of well-defined operations. However, it is far more complicated to estimate the travel time of a transportation vehicle.

In order to equip the work site with appropriate vehicles professionals today simulate the transportation vehicles route, taking into account several vehicle parameters such as motor power, capacity, gear transmission, wheels, etc, and also taking into account the route's characteristics including e.g. length, road type, inclinations etc.

When comparing travel time for say five alternative vehicles, each with five alternative configurations traveling on five alternative routes, there are 125 simulates to be conducted and compared. Moreover, each simulation requires heavy computing capacity and quite some computational time. The comparisons are often performed together with the client in an on-site demonstration, where both computing capacity and time are strictly limited.

Therefore, there is a need for a travel time estimation method, where vehicle parameters and road conditions are considered, that does not require heavy computing capacity and significant time.

It is desirable to achieve a travel time estimation method and computer program product where vehicle parameters and road conditions are considered, that does not require heavy computing capacity and significant time.

The inventor has realized that by providing a method that divides a route into sections with substantially constant road characteristics and utilize a database with traveling data for vehicles on the route sections, a total travel time may be estimated with limited computing capacity in a few seconds or less. Moreover, the inventor has realized that if considering the incoming speed from a preceding section when estimating the travel time for each section, the total travel time estimation may be estimated with increased accuracy.

According to a first aspect of the inventive concept, a method is provided for estimating a travel time for a vehicle comprising the steps of: determining a route for which the travel time is to be estimated; dividing said route into route sections, wherein each route section has substantially constant road characteristics; selecting a vehicle configuration for said vehicle; retrieving, from a database, an estimated travel time for each route section based on each route section for said selected vehicle configuration; and aggregating the estimated travel times for each route section from the database into a total travel time for said determined route.

In the context of the application "substantially constant road characteristics", should be understood as a route section allowing for substantially the same vehicle performance. Thereby, a substantially constant road characteristic means that the characteristics may deviate within a predetermined range. Limitations may be set so that e.g. for a route section to be defined as a "leveled straight road section" the predetermined range may be that the inclination may not exceed ±2%, and the section may not comprise curves with smaller turning radius than 50 meter. Moreover, as another example, a steep uphill route section may be any uphill exceeding 15% inclination, a medium steep uphill route between 10%-15% etc. Depending on how accurate estimations desired, the limit values for when e.g. a straight leveled route section becomes a curve or an uphill/downhill may be altered.

By providing a method for estimating a travel time for a vehicle as described above, it is possible to perform on-site demonstrations where time is precious and computing capacity very limited. Thereby, a method requiring less time and less computing capacity when trying to find the best fleet of vehicles is provided. Further, the fact that less computing capacity is required means that the agility is increased for anyone that wants to estimate the travel time. Moreover, by saving time and allowing for agile and ubiquitous estimation of travel time, ultimately a better service may be provided for a potential owner of a vehicle fleet.

Moreover, since the computing capacity required to perform the method described is so limited, the method allows for comparing a plurality of different routes and vehicle configurations substantially simultaneously. Thus, hundreds of combinations of routes and configurations may be conducted without the operation requiring hours of data computing. Instead, the comparisons may be conducted in seconds, or even fractions of seconds.

In one embodiment, the database comprises traveling data corresponding to said vehicle accelerating up to a predetermined cruising speed. When the database comprises traveling data corresponding to said vehicle accelerating up to a predetermined cruising speed, the database may allow for estimating the vehicle's travel time for an accelerating portion of the route section. Thereby, a more accurate estimation may be provided for a vehicle traveling a route section.

In the context of the application a "cruising speed", should be understood as substantially the speed a vehicle would travel on a route section if the section was infinitely long, i.e. a speed corresponding to a state of speed equilibrium. Thereby, the cruising speed in an uphill route section would be lower than a cruising speed in a downhill section, if all other parameters are kept constant. Thus, the cruising speed is affected by the physical circumstances. Substantially constant road characteristics may therefore be essentially similar road characteristics.

In yet one embodiment, the database comprises traveling data corresponding to said vehicle traveling in a predetermined cruising speed. When the database comprises traveling data corresponding to said vehicle traveling in a predetermined cruising speed, the database may allow for estimating the vehicle's travel time for a cruising speed portion of the route section. Thereby, a more accurate estimation may be provided for a vehicle traveling a route section.

In one embodiment, the database comprises traveling data corresponding to said vehicle decelerating to a predetermined cruising speed. When the database comprises traveling data corresponding to said vehicle decelerating to a predetermined cruising speed, the database may allow for estimating the vehicle's travel time for a decelerating portion of the route section. Thereby, a more accurate estimation may be provided for a vehicle traveling a route section.

In yet one embodiment, the database comprises traveling data corresponding to braking said vehicle from a predetermined max speed to substantially standing still. When the database comprises traveling data corresponding to braking said vehicle from a predetermined max speed to substantially standing still, the database may allow for estimating the vehicle's travel time for a braking portion of the route section. Thereby, a more accurate estimation may be provided for a vehicle traveling a route section.

In one embodiment, the traveling data comprises distance, speed and time data. The traveling data may comprise what speed the vehicle would have at each time unit until a cruising speed is reached, or what speed the vehicle would have at each traveled distance until a cruising speed is reached. Thereby, the calculations of estimated travel time may be conducted with the simple rules of arithmetic.

In yet one embodiment, the traveling data comprises acceleration and any one of speed, distance or time data. The traveling data may comprise what acceleration the vehicle would have at each time unit or traveled distance, until a cruising speed is reached when the acceleration would be substantially zero. Thereby, the calculations of estimated travel time may be conducted with the simple rules of arithmetic.

In one embodiment, the traveling data further comprises fuel consumption. Thereby, not only the travel time may be estimated in the method, but also the fuel consumption of the travel may be estimated. This may be of great interest for a potential fleet vehicle owner, whom most likely would pay the fuel for the vehicles. By considering the cost of fuel for each evaluated vehicle and adding the aspect of estimated travel time, an even better basis for deciding on what vehicle to choose may be obtained. In fact, the fuel costs typically amount to about 50% of the total costs for running a gravel pit. Moreover, it would be possible to estimate when the vehicle need to refuel, and thus be idle for a moment.

In further embodiments, the traveling data may comprise energy consumption. Thereby, if the vehicle is an electric vehicle it is also possible to estimate when and how often the vehicle needs to charge the batteries. This is a great advantage, as charging a battery often require quite some time, making the vehicle idle during that time. Moreover, the cost for the used energy may be calculated.

In yet one embodiment, the estimated travel time for each route section is dependent on the traveling data of a previous route section, unless the route section is the first route section of the route. Thereby, the route section may be handled dynamically, and depended on each other, resulting in that the accuracy of the travel time estimation may be increased substantially.

In one embodiment, the estimated travel time for a route section is estimated by the partial steps: determining the vehicle's final speed at the end of the directly preceding route section, and assigning said final speed from the preceding route as an initial speed for the current route section. Since the vehicle's speed in any section is linearly related to the travel time, the speed of the vehicle in each section affects the estimated travel time. By considering the final speed in a first route section and relating it to the initial speed in a second route section, the accuracy of the estimated travel time may be increased. E.g. if comparing the travel time for a 40 meter long straight leveled route section, the travel time would be shorter if the vehicle is coming from a fairly long downhill route section with a relatively high speed, than if the vehicle would come from an uphill route section, with a substantially lower speed. Simply put, the average speed in the route section is affected by the incoming speed in the route section which is determined by the final speed obtained in the previous route section.

In yet one embodiment, the route sections are divided into vehicle speed curves, wherein each vehicle speed curve represent one of: said vehicle accelerating up to a predetermined cruising speed, said vehicle traveling in a predetermined cruising speed, said vehicle decelerating to a predetermined cruising speed, or braking said vehicle to substantially standing still.

In yet one embodiment, the estimated travel time for each route section is estimated by estimating each travel time for at least a portion of any relevant speed curve and subsequently aggregating the travel time for said portions of any relevant speed curves into a travel time for each route section. Thereby, each route section may be divided into speed curves, and relevant portions of each speed curve may be used to estimate the travel time of the route sections. For example, to estimate the travel time of a first section, a travel time for a speed curve starting with the vehicle standing still and running until the cruising speed may be estimated. Thereafter, the estimated travel time for the remaining portion of the section may be estimated by estimating the travel time of the vehicle traveling in a cruising speed in the remaining distance of the route section. This is further explained in the detailed description below. Thereby, the method's accuracy is increased with simple means.

In yet one embodiment, the selected vehicle configuration comprises at least one of motor power, weight, load, fuel consumption and gear transmission. Thereby, parameters affecting the vehicles performance which in turn affects the travel time may be considered. Thus, the accuracy of the travel time estimation may be increased.

In one embodiment, the road characteristics comprise at least one of distance, inclination, rolling resistance, and bend of a curve. Thereby, parameters of the route affecting the vehicles performance which in turn affects the travel time may be considered. Thus, the accuracy of the travel time estimation may be increased.

In yet one embodiment, the method further comprises the step of determining the driver characteristics of the driver of said vehicle, and wherein the database further comprises traveling data corresponding to driver characteristics. Since different driver characteristics would generate different traveling times, a more accurate travel time may be estimated by also considering the drivers characteristics. E.g. a driver looking to minimize fuel consumption, e.g. by applying of the concept of ECO-driving, would generate a different speed profile than a driver looking to merely minimizing travel time.

According to a second aspect of the inventive concept, above and other aspects of the inventive concept is achieved through a method for creating a database for use of estimating a travel time for vehicles, comprising: defining a plurality of vehicles, each vehicle with a plurality of configurations, for which the travel time is to be estimated, defining a plurality of route sections, wherein each route section has substantially constant road characteristics, generating a database comprising traveling data corresponding said defined vehicles traveling along said route sections.

Wherein the traveling data comprise vehicle speed curves representing: said vehicles accelerating to a predetermined cruising speed, said vehicle traveling in a predetermined cruising speed, said vehicle decelerating to a predetermined cruising speed, or braking said vehicle to substantially standing still.

Thereby, a database to be used for estimating a travel time for vehicles could be generated. By generating the database in advance, less time and computer capacity is required when travel time estimation of a vehicle is needed. Moreover, the advantages of the invention according this aspect are substantially analogous to the advantages as stated above.

According to a third aspect of the inventive concept, above and other aspects of the inventive concept is achieved through use of the database formed according to above for estimating a travel time for a vehicle according to any of the embodiments as described above. The advantages of the invention according this aspect are substantially analogous to the advantages as stated above.

According to a forth aspect of the inventive concept, above and other aspects of the inventive concept is achieved through a computer program product comprising a computer readable medium having stored thereon computer program means for estimating a travel time for a vehicle, wherein the computer program product comprises: code for determining a route for which the travel time is to be estimated, code for dividing said route into route sections, wherein each route section has substantially constant road characteristics, code for selecting a vehicle configuration for said vehicle, code for retrieving, from a database, an estimated travel time for each route section based on each route section for said selected vehicle configuration, and code for aggregating the estimated travel times for each route section from the database into a total travel time for said determined route. Thereby, a computer program product may enable the use of a database for estimating a travel time for vehicles. Thereby, less time and computer capacity is required when travel time estimation of a vehicle is needed. Moreover, the advantages of the invention according this aspect are substantially analogous to the advantages as stated above.

The computer readable medium may be one of a removable nonvolatile random access memory, a hard disk drive, a floppy disk, a CD-ROM, a DVD-ROM, a USB memory, an SD memory card, or a similar computer readable medium known in the art. The present invention may be implemented using a combination of software and hardware elements.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 7:
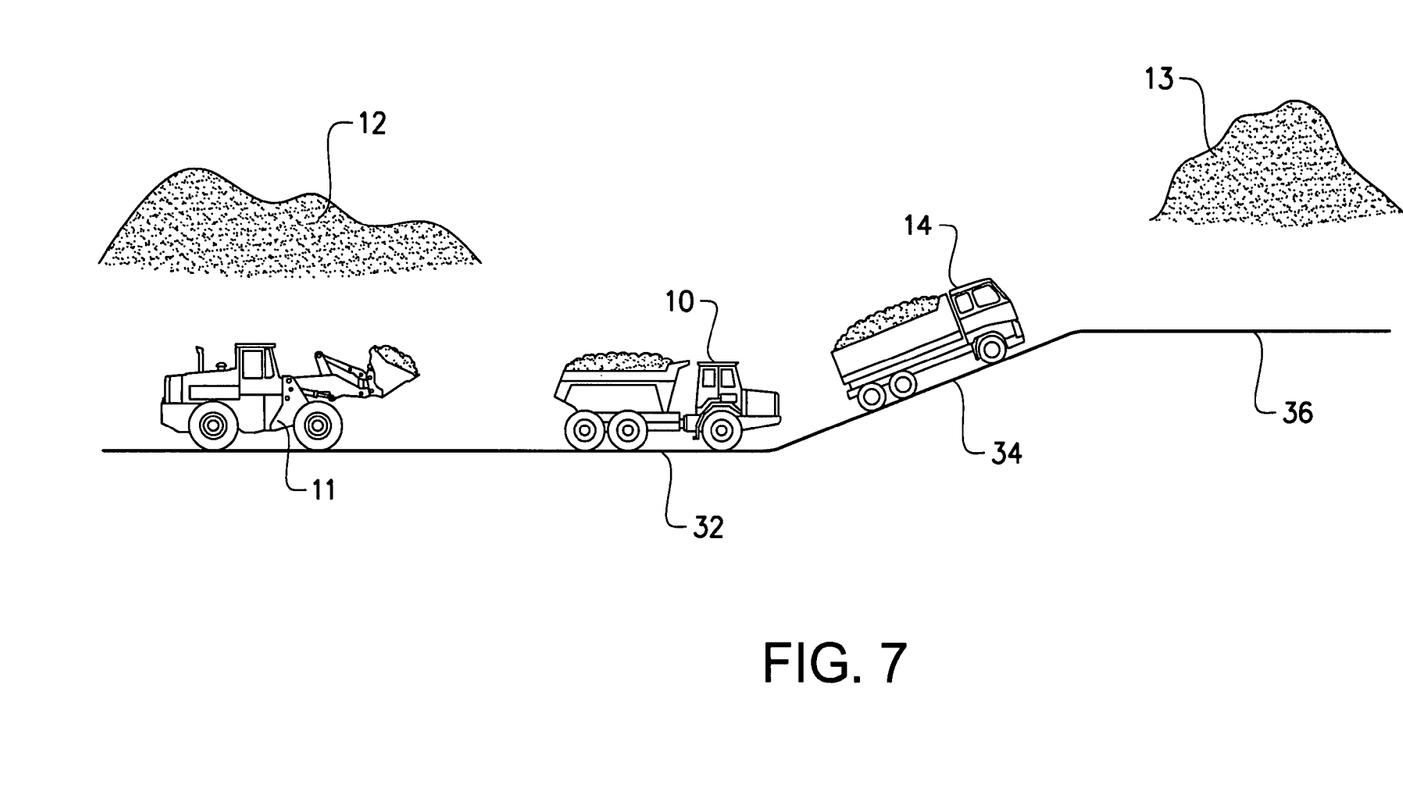
FIG. 7 schematically illustrates a sand pit where a transportation vehicle travels along a route from a loading place to an unloading place.

FIG. 7 presents a worksite where a wheel loader 11 is loading from a loading position 12, and a dumper 10 is transporting the sand on a route comprising three section 32, 34, 36, wherein the first 32 and the last 36 sections are of the same type, namely leveled straight sections, and the middle section 34 is an uphill section. The distance of the first section 32 is 50 meters, the second section 34 is 40 meters and the third section 36 is 80 meters. Moreover, there is an unloading position 13 at the end of the route. The setup as shown in FIG. 7 will be used to explain the method below.

Figure 1:
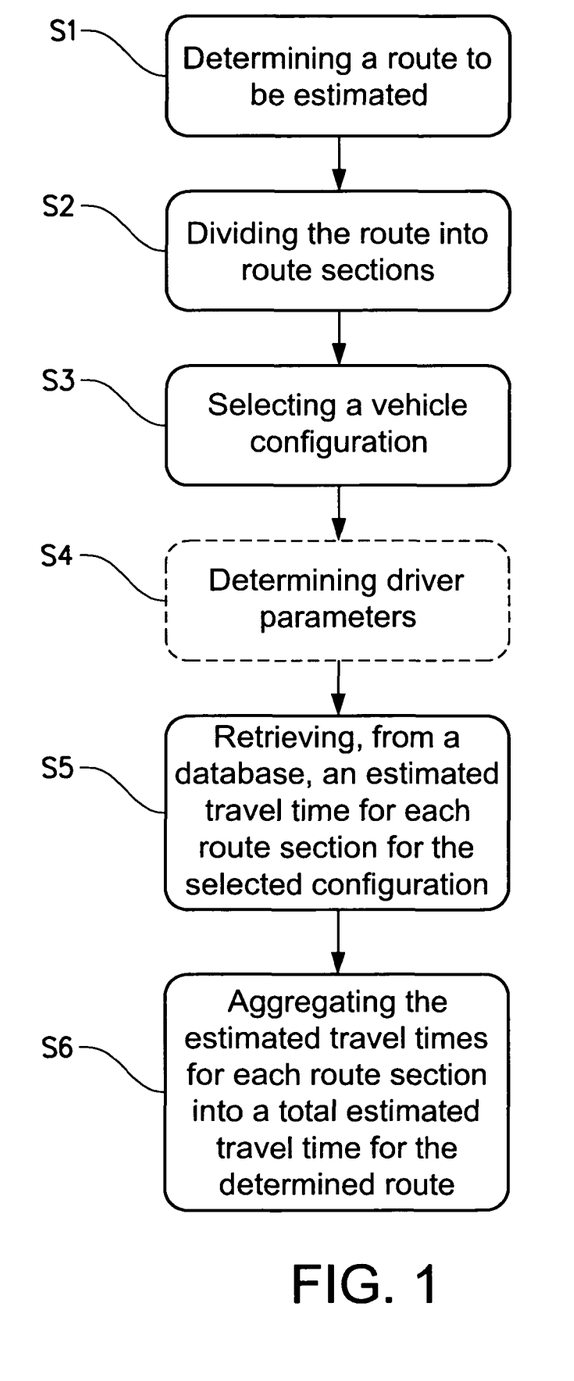
FIG. 1 schematically illustrates a flow chart of a method according to one embodiment.

FIG. 1 shows the different steps of a method for a travel time for a vehicle 10. Each step is associated with a reference number; however, all steps do not necessarily need to be performed in the order of the reference signs, e.g. step S3 may be performed before S2 etc.

The first step S1 being to determine a route to be estimated. This step S1 is generally done by setting out a starting point, e.g. the loading position 12 as shown in FIG. 7, and a terminal point, e.g. the unloading position 13, and to decide on a route connecting the starting point to the terminal point. In some cases there may be several potential starting and loading positions 12 as well as potential routes connecting the two points. Regardless, in this step S1 only one route is to be selected. However, if several routes are to be compared, the whole method may be conducted a number of times and then the results may be compared in order to choose a preferred route and/or vehicle 10.

The second step S2 is to divide the determined route into route sections. An example is shown in FIG. 7. Each route section shall have substantially constant road characteristics. In FIG. 7 the first 32 and last 36 sections are leveled straight section, and the second section 34 is an uphill section. As discussed above, the most important parameter to determine "substantially constant road characteristics" is that the route section should allow for substantially constant vehicle performance, e.g. performance relating to cruising speed, top speed, acceleration profile and/or deceleration profile. This indicates that a certain range of e.g. inclination may be decided to define a road type to be e.g. a leveled road. Typical road characteristics may relate to e.g. inclination, distance, rolling resistance, bend of a curve, etc. A route may in another example be divided into five sections comprising a leveled straight section, leveled curved section, uphill straight section, leveled straight section, and finally a downhill curved section. However, a route may be divided into any number of route sections. To obtain a more exact estimation of time, the limit values, or ranges, for what should be considered to be "constant" characteristics may be altered. E.g. there may be either one single type of "uphill section", or five different uphill sections, all having different inclination etc. As discussed, depending on how accurate travel time estimations are desired, the limit values for when e.g. a straight leveled route section becomes a curve or an uphill/downhill route section may be altered.

It is possible to either manually estimate the different route sections based on their road characteristics. It is further possible to import data from existing map data. Moreover, it may be done through measuring the route with GPS equipment or equivalents.

In the subsequent step S3, the vehicle configuration is selected. As discussed above, the internal order of all the steps are not important for the function. The reason to why the vehicle configuration is considered is that the vehicle specific parameters affect the vehicle performance and consequently, the travel time. Dependent on the type of vehicle 10, these parameters may differ. However, a few examples of parameters to be considered in the configuration are vehicle weight, load weight, motor power, gear transmission, tires etc.

Figure 4B:
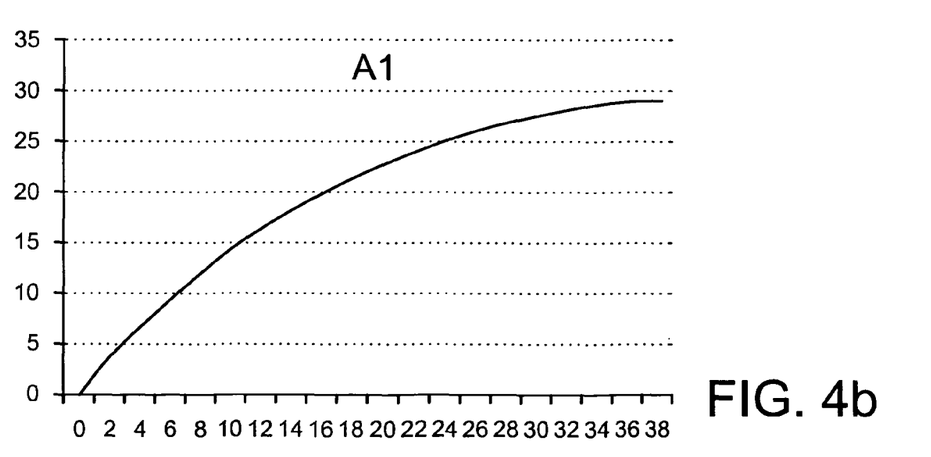
FIG. 4b is a table with travel data from a simulation result for accelerating a vehicle on a route section being a plane road.
Figure 5A:
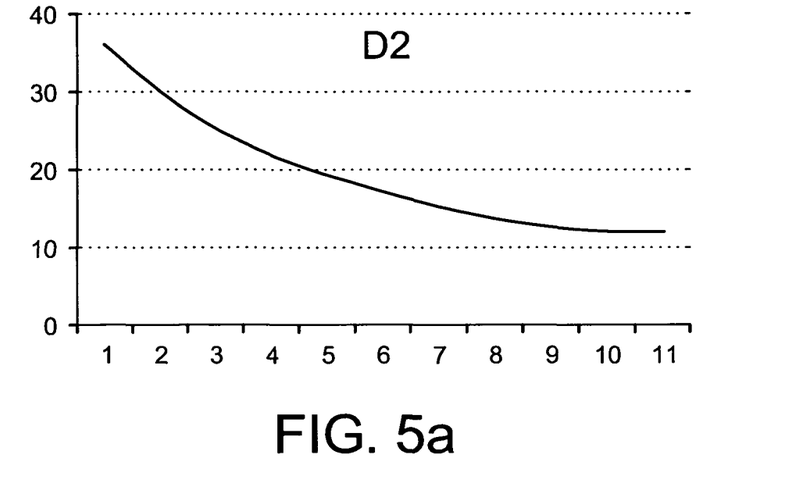
FIG. 5a schematically illustrates a simulation result for deceleration of a vehicle due to that the route being a plane an uphill slope.
Figure 5B:
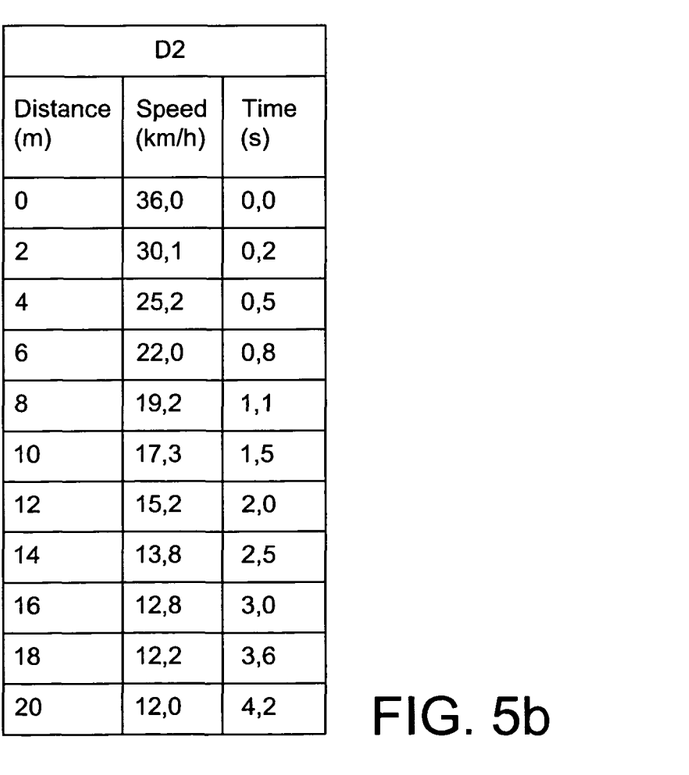
FIG. 5b is a table with travel data from a simulation result for deceleration of a vehicle due to that the route being a plane an uphill slope.
Figure 6A:
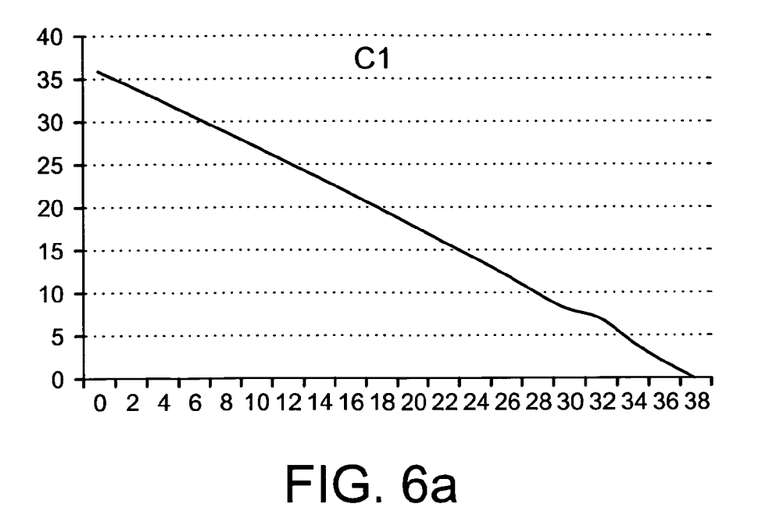
FIG. 6a schematically illustrates a simulation result for decelerating a vehicle on a route section being a plane road.
Figure 6B:
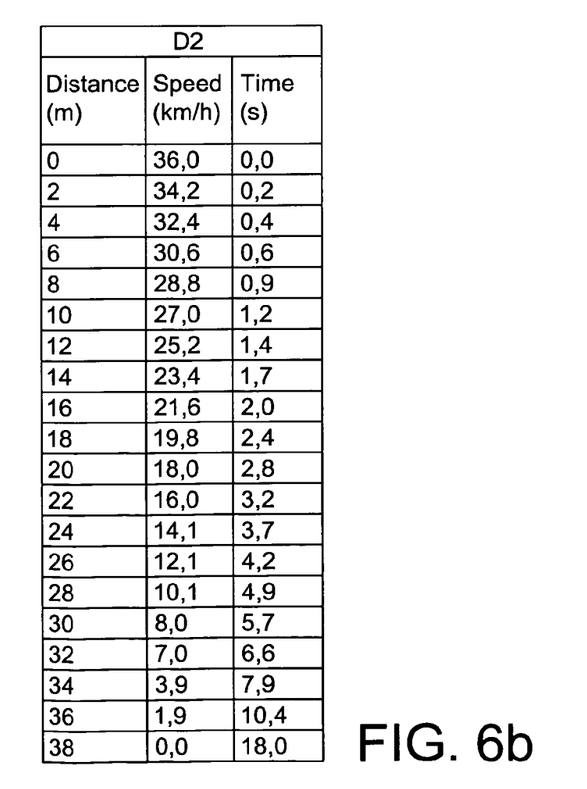
FIG. 6b is a table with travel data from a simulation result for decelerating a vehicle on a route section being a plane road.

The purpose of the three first steps is to determine the prerequisites for calculating the travel time, and thereby determine which travel data to select from the database for performing the estimation. That is, each vehicle configuration has already been simulated on each route sections and traveling data has been generated for each combination, so as to allow for simple computing requiring only milliseconds for estimating the travel time. The database with traveling data may be ordered in traveling data tables as illustrated in FIGS. 4b, 5b, and 6b. The example below will use this type of data tables, although it is evident that the traveling data may be structured in another way in a database.

In FIG. 1, an optional step S4 of determining driver parameters is disclosed. Since different driver types may generate a different set of travel data tables with the same vehicle configuration on the same route section, it may also be relevant to consider the driver. E.g. a driver looking to minimize fuel consumption, e.g. by applying of the concept of ECO-driving, would generate a different speed profile than a driver looking to minimizing travel time. Therefore, an optional step S4 in the method of determining the driver parameters is included. The driver parameter may represent e.g. the drivers experience, ECO-driving, time minimizing drivers, etc. For being able to consider driver parameters, it is necessary that the created database comprise travel data corresponding to different driver parameters.

The next step S5 in the method according to FIG. 1 is to retrieve, from a database, an estimated travel time for each route section for the selected configuration. That is, the estimated travel time retrieved from the database corresponds to the determined route sections, vehicle configuration and, if determined, driver parameters. As discussed above, the traveling data tables represents travel data from simulations of the selected vehicle configuration traveling on the identified route sections. The traveling data may comprise, as discussed in more detail below, any traveling data allowing for estimating travel time. In the example below, the traveling data comprises speed and travel time as a function of covered distance. However, it might also be possible form a travel data table comprising acceleration/deceleration and speed, travel time or covered distance to enable travel time estimations with simple calculations.

Moreover, it would be possible to create corresponding traveling data by means of driving a number of vehicles with different parameters on different road sections with different drivers, and recording a number of speed curves which may be stored in a database. Thereby, traveling data for usage of the method as described for estimating a travel time may be generated.

One way in which the estimated travel time for each route section may be retrieved from the database is by retrieving the relevant traveling data. In one example, as discussed further below when the database is ordered as data tables, this is carried out by first determining the vehicle's 10 initial speed, which decides the starting point in the traveling data table. Thereafter, the distance of the section is considered, which gives the ending point in the traveling data table.

The final step S6 of the method is aggregating the estimated travel times for each route section into a total estimated travel time for the determined route. This step is conducted by adding the travel time for each route section into a total travel time. Since these calculations are simple calculations with the four fundamental rules of arithmetic, the calculations will only take a few milliseconds, which may be compared to simulations used today, taking maybe 60 seconds or more and requiring far more computing capacity.

Figure 2A:
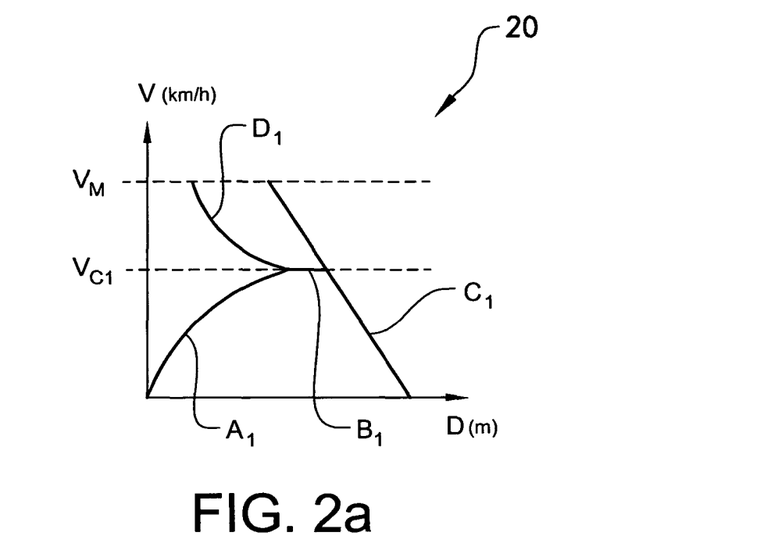
FIG. 2a schematically illustrates simulation results for a plane road, the results being presented in graphs with distance and speed on the two axes.
Figure 2B:
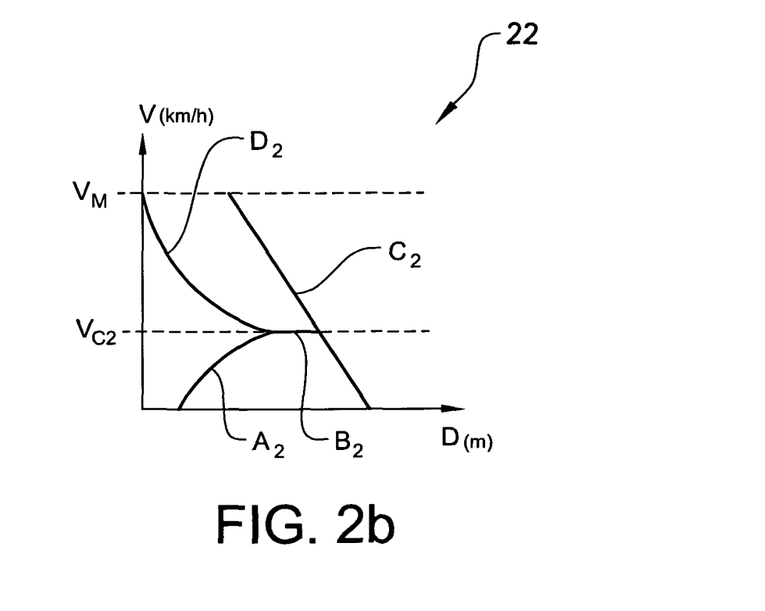
FIG. 2b schematically illustrates simulation results for an uphill slope, the results being presented in graphs with distance and speed on the two axes.
Figure 3A:
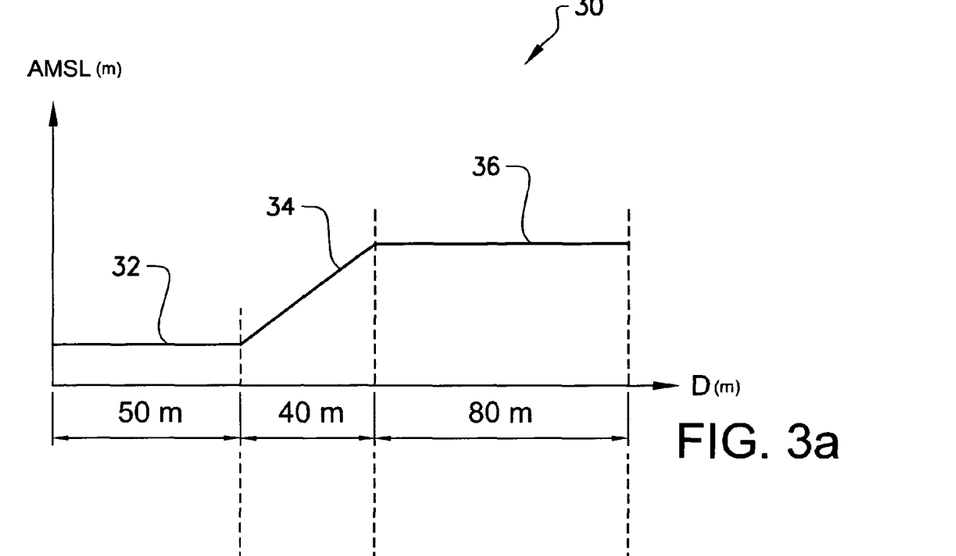
FIG. 3a schematically illustrates a route with three route sections.

FIGS. 2a, 2b, 3a, and 3b illustrate an example of how the method may be applied on a route the three route sections 32, 34, 36. FIG. 3a displays the route in an inclination graph 30 displaying a relative value of Above Mean Sea Level (AMSL) as a function of the covered distance of the vehicle 10. The route is the same example as described in relation to FIG. 7, i.e. where the route is divided into three sections 32, 34, 36, wherein the first 32 and the last 36 sections are of the same type, namely leveled straight sections, and the middle section 34 is an uphill section. The distance of the first section 32 is 50 meters, the second section 34 is 40 meters and the third section 36 is 80 meters.

For the determined vehicle configuration and the two section types, i.e. leveled route section and uphill section, two dynamic graphs 20, 22 have been generated in advance based on a simulation, as displayed in FIGS. 2a and 2b. FIGS. 2a and 2b show dynamic graphs 20, 22 for the speed of the vehicle 10 as a function of the covered distance on the two different route sections.

FIG. 2a shows a dynamic graph where the route section is a straight leveled road and FIG. 2b where the route section is a straight uphill road. The dynamic graphs 20, 22 have a maximum speed VM and a cruising speed Vc. Moreover, four curve types are generated in each dynamic graph 20, 22. The first curve type A1, A2 represents the acceleration from standing still to cruising speed Vc. The second curve type B1, B2, represents steady speed at cruising speed. It is not necessary that this is an actual curve, as traveling in a steady cruising speed will result in a constant speed, which is not dependent on the traveled time or distance. The third curve type C1, C2, represents applying the brakes of the vehicle 10 from a maximum speed to standing still. This does not necessarily mean that the breaks are fully actuated in a "sudden brake", but rather that the vehicle is decelerated in a "normal" manner. The way of braking the vehicle may vary depending on the vehicle configuration and the road section type, e.g. in an uphill it might be sufficient to just release the throttle, and on a straight road the brakes may be applied gently. Further, the fourth curve type D1, D2 represents deceleration from max speed VM to cruising speed Vc. Such a curve is applicable e.g. when coming from a previous route section having a higher cruising speed Vc than the present route section, that is, if the initial speed when entering a new section is higher than the cruising speed Vc of the section.

Figure 3B:
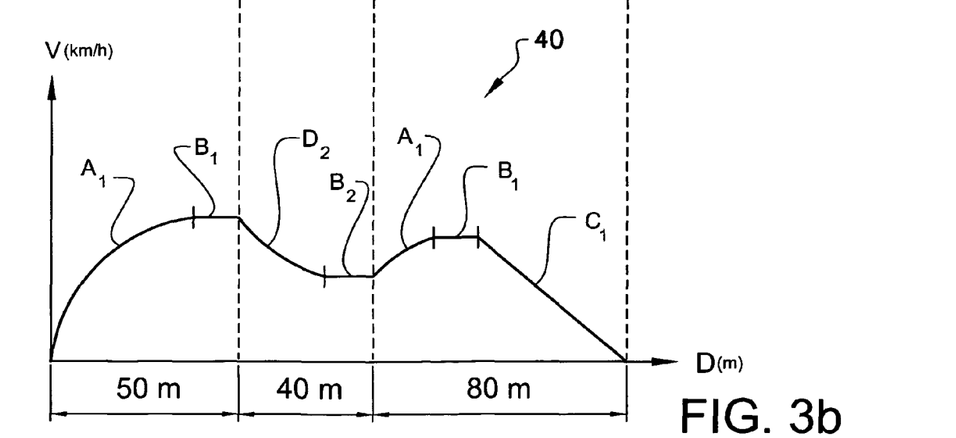
FIG. 3b schematically illustrates a speed profile for a route with three route sections, the profile being presented in a graph with distance and speed on the two axes.

In order to graphically illustrate the methodology as explained above on how to use the travel data tables, a speed graph 40 of the determined route with the three route sections 32, 34, 36 are displayed in FIG. 3b. For each route section 32, 34, 36, the speed has been illustrated with data from the simulated dynamic graphs 20, 22. The first route section 32 is represented by the two first speed curves A1, B1, where the first speed curve represents the acceleration from standing still to a cruising speed VC1 in a leveled straight route section. Further, the second curve B1 represents the cruising speed VC1 in a leveled straight route section.

The next route section 34, i.e. the uphill route section, is illustrated by the second D2 and third B2 speed curves. The second speed curve D2 represents the deceleration from the cruising speed Vci in a leveled straight route section (since coming from the first route section 32) to a cruising speed Vc2 in an uphill straight route section. Moreover, the third speed curve B2 represents the cruising speed VC2 in an uphill straight route section.

The third route section 36 is represented by the last three speed curves A1, B1 and C1. In the same way as the two first speed curves the fifth speed curve A1 represents the acceleration from standing still to a cruising speed VC1 in a leveled straight route section, and the sixth curve B^ represents the cruising speed VC1 in the leveled straight route section.

Moreover, the last speed curve C1 represents that the vehicle 10 has activated the brakes from a cruising speed VC1 until standing still.

As graphically illustrated in FIG. 3b, the initial speed in a route section corresponds to the final speed of the vehicle 10 in any previous route section.

Below an example on how to use the traveling data tables, as illustrated in FIG. 4a-FIG. 6b, for estimating the travel time will be declared. For pedagogical reasons, the same example as used above is used also in this case, i.e. where the total route comprises three route sections 32, 34, 36, wherein the first 32 and the third 36 sections are of the same type, namely leveled straight sections, and the second section 34 is an uphill section.

Figure 4A:
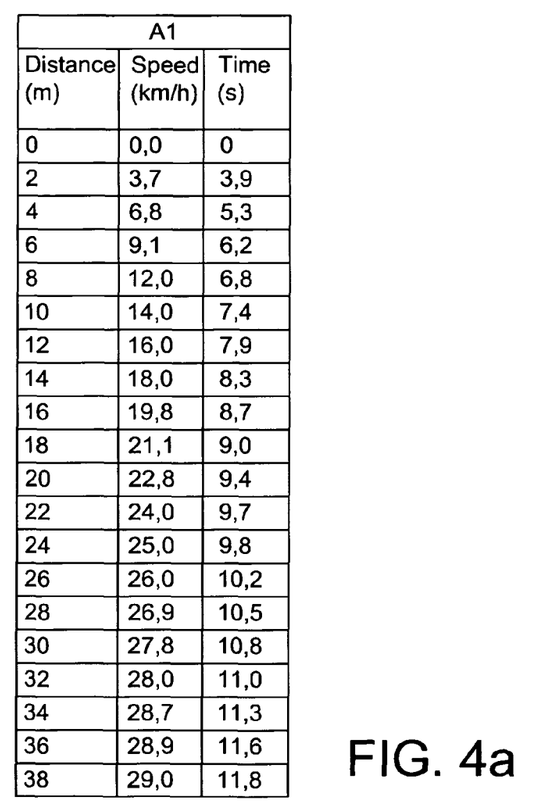
FIG. 4a schematically illustrates a simulation result for accelerating a vehicle on a route section being a plane road.

To estimate the travel time of the first section 32, the speed curve Ai as illustrated in FIG. 4a, is followed from that the vehicle 10 is standing still until the cruising speed Vc of 29 km/h. According to the traveling data table this will take 11.8 seconds and 38 meters. Since the first route section is 50 meters long, as discussed above, another 50−38=12 meters remain of the first section. The time for traveling this distance at the cruising speed is (12/29)*3.6=1.5 seconds (3.6 being the converting factor between km/h and m/s). Thus, the total traveling time of the first section is 11.8±1.5=13.3 seconds.

The next step is to estimate the travel time of the second section 34, which is done with help from the table in FIG. 5b. In order to obtain an as good estimation as possible, one should enter the table at a speed corresponding to the final speed in the first route section 32 i.e. 29 km/h. When looking into the table as shown in FIG. 5b, this point of entrance would be somewhere between 2 seconds and 4 seconds. In order to choose the best starting point in the table, several methods may be used. As one example, one may choose the point being closest to the desired speed value. In another example, in order to achieve a more accurate estimation, an interpolated point between the two values may be calculated. In this example, the closest point is chosen, i.e. 2 meters (corresponding to 30.1 km/h and 0.2 seconds). From this point, the speed curve is followed down to the cruising speed 12 km/h, which will take 4.2−0.2=4 seconds or 20−2=18 meters. Since the whole route section is 40 meters, as defined above, there is 40−18=22 meters remaining of the route section, for which the vehicle 10 will travel in the cruising speed of 12 km/h. The time spent for covering that distance is (22/12)*3.6=6.6 seconds. Thus, the total travel time for the second route section is 4.0+6.6=10.6 seconds.

The last route section is calculated in a corresponding manner. First, the initial speed may be considered, which is 12 km/h. The corresponding speed in the speed curve Ai as shown in FIG. 4a and FIG. 4b is after 8 meters and 6.8 seconds. The speed curve will be followed up until the cruising speed VC1 29 km/h is reached. According to the table, that will take 11.8−6.8=5 seconds and 38−8=30 meters. The distance which the vehicle 10 will drive in the cruising speed VC1 is dependent on when the braking should be initiated according to the speed curve C1 to achieve the vehicle 10 to stop at the end of the third route section 36. The initial speed is 29 km/h, i.e. about 8 meter or 0.9 seconds from the top of the data table. From that point, it requires 38−8=30 meters for the vehicle 10 to stop. That means that, since the total distance of the third route section 36 is 80 meters, there is 80−30−30=20 meters in which the vehicle 10 will travel in cruising speed VC. To travel 20 meters in 29 km/h takes (20/29)*3.6=2.5 seconds. Further stopping the vehicle 10 from 29 km/h takes according to the table 18−0.9=17.1 seconds. Thus, the total estimated travel time for the third route section 36 is 5+2.5+17.1=24.6 seconds.

Now, the travel time for each route section is estimated, all that is left is the final step S6 of the method namely to aggregate the estimated travel times for each route section into a total estimated travel time for the whole route, which is 13.3+10.6+24.6=48.5 seconds.

In some cases the deceleration may need to be started before the last section, in such a case, it is possible to calculate from the end of the last section and just follow the different sections' deceleration curves until the point where the deceleration needs to be started.

In the example above, the vehicle always reaches the cruising speed, however for some shorter route sections this may not be the case.

When explaining the method as done above, the method might seem complicated. However, every single step in the method may be translated into a simple operation, and by means of only a few lookup table commands together with a few simple mathematical calculations using the four rules of arithmetic, the travel time may be estimated in only milliseconds.

It should further be noted that the travel data tables comprise a limited amount of data to handle. Even if the tables were to be created with a lower pitch, e.g. one row for every tenth of a second instead of every other second as used in the example, the amount of data is still limited for a computer to handle. The calculations will be able to be conducted in a few ms although a limited amount of computing capacity is used.

Moreover, in some situations it might be interesting to also estimate the fuel consumption of a vehicle 10 using the same method. All the principles may still be used as described above. The only difference would be that the preceding simulations should also generate a fuel consumption column (as a complement or substitute for the time column in the example above), and that the calculations would be conducted based on the value in the fuel consumption column in addition to (or instead of) the time column. Thereby, a method for calculating the fuel consumption may be achieved by using the same method.

The invention claimed is:

1. A method for estimating a travel time for a vehicle comprising the steps of:
    determining a route for which the travel time is to be estimated;
    dividing the route into route sections, wherein each route section has substantially constant road characteristics;
    selecting a vehicle configuration for the vehicle;
    retrieving, via a computer, from a database, an estimated travel time for each route section based on each route section for the selected vehicle configuration; and
    aggregating, via the computer, the estimated travel times for each route section from the database into a total travel time for the determined route,
    wherein the database comprises traveling data corresponding to the vehicle accelerating up to a predetermined cruising speed, allowing for estimating the vehicle's travel time for an accelerating portion of the route section
    wherein the database comprises traveling data corresponding to braking the vehicle from a predetermined max speed to substantially standing still, allowing for estimating the vehicle's travel time for a braking portion of the route section.

2. Method according to claim 1, wherein the database comprises traveling data corresponding to the vehicle traveling in a predetermined cruising speed.

3. Method according to claim 1, wherein the database comprises traveling data corresponding to the vehicle decelerating to a predetermined cruising speed.

4. Method according to claim 1, wherein the traveling data comprises distance, speed and time data.

5. Method according to claim 1, wherein the traveling data comprises acceleration and any one of speed, distance or time data.

6. Method according to claim 4, wherein the traveling data further comprises energy consumption or fuel consumption.

7. Method according to claim 1, wherein the estimated travel time for each route section is dependent on the traveling data of a previous route section, unless the route section is the first route section of the route.

8. Method according to claim 7, wherein the estimated travel time for a route section is estimated by the partial steps:
    determining the vehicle's final speed at the end of the directly preceding route section;
    assigning the final speed from the preceding route as an initial speed for the current route section.

9. Method according to claim 1, wherein the route sections are divided into vehicle speed curves, wherein each vehicle speed curve represent one of;
    the vehicle accelerating up to a predetermined cruising speed;
    the vehicle traveling in a predetermined cruising, speed;
    the vehicle decelerating to a predetermined cruising speed; or
    braking the vehicle to substantially standing still.

10. Method according to claim 1, wherein the estimated travel time for each route section is estimated by estimating each travel time for at least a portion of any relevant speed curve and subsequently aggregating the travel time for the portions of any relevant speed curves into a travel time for each route section.

11. Method according to claim 1, wherein the selected vehicle configuration comprises at least one of motor power, weight, load, fuel consumption, energy consumption, tires and gear transmission.

12. Method according to claim 1, wherein the road characteristics comprise at least one of distance, inclination, rolling resistance, speed limits and bend of a curve.

13. Method according to claim 1, wherein the method further comprises the step of determining, via the computer, the driver characteristics of the driver of the vehicle, and wherein the database further comprises traveling data corresponding to driver characteristics.

14. A method for creating a database for use of estimating a travel time for vehicles, comprising:
    defining a plurality of vehicles, each vehicle with a plurality of configurations, for which the travel time is to be estimated;
    defining a plurality of route sections, wherein each route section has substantially constant road characteristics; and
    generating a database comprising traveling data corresponding the defined vehicles traveling along the route sections, wherein the traveling data comprise vehicle speed curves representing:
    the vehicles accelerating to a predetermined cruising speed;
    the vehicles traveling in a predetermined cruising speed;
    the vehicles decelerating to a predetermined cruising speed; and/or
    braking the vehicles to substantially standing still.

15. Computer program product comprising a non-transitory computer readable medium having stored thereon a computer program for estimating a travel time for vehicle, wherein the computer program product comprises:
    code for determining a route for which the travel time is to be estimated;
    code for dividing the route into route sections, wherein each route section has substantially constant road characteristics;
    code for selecting a vehicle configuration for the vehicle;
    code for retrieving, from a database, an estimated travel time for each route section based on each route section for the selected vehicle configuration; and
    code for aggregating the estimated travel times for each route section from the database into a total travel time for the determined route,
    wherein the database comprises traveling data corresponding to the vehicle accelerating up to a predetermined cruising speed, allowing for estimating the vehicle's travel time for an accelerating portion of the route section
    wherein the database comprises traveling data corresponding to braking the vehicle from a predetermined max speed to substantially standing still), allowing for estimating the vehicle's travel time for a braking, portion of the route section.

* * * * *